(12) United States Patent
Veeraraghavan et al.

(10) Patent No.: US 7,437,427 B1
(45) Date of Patent: Oct. 14, 2008

(54) ACCESSING MULTIPLE WEB PAGES FROM A SINGLE URL

(75) Inventors: Venkatesh Veeraraghavan, Seattle, WA (US); Matthew Labarge, Seattle, WA (US); Mike Arcuri, Seattle, WA (US); Bryant Fong, Redmond, WA (US); Nathan J. Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 10/782,510

(22) Filed: Feb. 18, 2004

(51) Int. Cl.
*G06F 15/16* (2006.01)
*G06F 15/173* (2006.01)
*G06F 15/177* (2006.01)

(52) U.S. Cl. ............ 709/217; 709/219; 709/203; 707/1; 707/3

(58) Field of Classification Search ......... 709/217–288, 709/200–203, 3; 707/1, 3
See application file for complete search history.

(56) References Cited

U.S. PATENT DOCUMENTS 7,228,301 B2* 6/2007 Meyerzon et al. ............ 707/3

2002/0052934 A1* 5/2002 Doherty ................. 709/219
2004/0068477 A1* 4/2004 Gilmour et al. .............. 707/1

OTHER PUBLICATIONS

A. Sugiura et al., "Internet Scrapbook: Creating Personalized World Wide Web Pages", CHI Conference-Human Factors in Computing Systems, pp. 343-344, Mar. 22-27, 1997.
V. Anupam et al., "Personalizing the Web Using Site Descriptions", IEEE Computer Society, Tenth International Workshop on Database and Expert Systems Applications, pp. 1-7, Sep. 1-3, 1999.

* cited by examiner

*Primary Examiner*—Haresh N Patel
(74) *Attorney, Agent, or Firm*—Merchant & Gould; Timothy P. Sullivan

(57) ABSTRACT

A system and method is provided for personal sites. The personal sites are associated with a single Uniform Resource Locator (URL). A personal site may contain information that is useful to both the web page owner and other groups of users. According to one aspect of the present invention, the personal site may have two or more views instead of one: one homepage for the web page owner and other homepages directed at other specific users. The present invention allows a web page owner to control access to multiple web pages from a single URL, thereby allowing different groups to have different views of the owner's content. In one embodiment, a web server redirects users to different web pages by analyzing identifiers associated with each web page query.

26 Claims, 9 Drawing Sheets

Fig. 2

ACCESSING MULTIPLE WEB PAGES FROM A SINGLE URL

BACKGROUND OF THE INVENTION

An employee of a particular company often has information that they provide, information that they access, and information regarding the employee all kept by the company in the course of business. For example, the company may provide a web page that the public or other employees of the company may access to learn more information about another employee. The company may also provide a company page or site that all employees may access to receive updates and other company generated notices. Another site may be provided by the company for the storage and retrieval of documents created by an employee or other company groups. The number of sites that an employee must access for all the necessary information that they need in work day may increase greatly. Groups to which the employee belongs may create their own pages with information directed to that group. The employee may also need to access information from outside sources, such as stock tracking sites or other information. The information accessed by employees within a company setting can therefore be vast, with some information directed to a particular employee and other information directed to the company or public at large.

SUMMARY OF THE INVENTION

The present invention is directed towards providing a system and method for personal sites. The personal sites are associated with a single Uniform Resource Locator (URL). A personal site may contain information that is useful to both the web page owner and other groups of users. In addition, a personal site may contain information that is pushed to the user by organizations to which the user belongs, as well as information that the user personally selects. According to one aspect of the present invention, the personal site may have two or more homepages or views instead of one: one homepage for the web page owner and other homepages directed at other specific users. The present invention allows a web page owner to control access to multiple web pages from a single URL, thereby allowing different groups to have different views of the owner's content. In one embodiment, a web server redirects users to different web pages by analyzing identifiers associated with each web page query. Navigating to the personal site using identifiers allows organizations to have different personal site hosts, and also facilitates geographically distributed organizations with access to the personal sites outside of a single local area network.

The web server acts as a portal provider for each person accessing the web sites. Each person using the portal has the ability to have a personal web site to access, store, and organize their own information. In one embodiment, the personal web site is organized with personal content and lockdown content. In the company setting, the lockdown content allows the company to target information specifically to an employee. The web page acting as the portal for the employee ensures that the employee needs only one place to access information from multiple disparate sources. Since each person has a web site that stores their information, the information is accessible from any machine that has a browser. In one embodiment, the location of each person's personal site may be stored in a central directory or data store, allowing for automatic connection to the personal site from multiple machines. The content that may be accessed includes targeted information, their documents and lists, any web pages that they have created, and other information. The information corresponding to the personal site may contain information that is useful to both the person itself and others. Multiple views of the personal site are therefore provided for the various groups or individuals accessing the site. The multiple but connected sites allow an owner looking at the site to see a view that contains information that is targeted to him or her, while showing everyone else a view that is optimized show information about the person.

BRIEF DESCRIPTION OF THE DRAWINGS

FIG. 2 illustrates an exemplary portal homepage that allows a user to generate a personal site;

DETAILED DESCRIPTION OF THE PREFERRED EMBODIMENT

Generally, the present invention is directed towards providing a system and method for providing personal sites. The personal sites are automatically created from a portal. Until now, all that was allowed from either employee or public portals was a page or multiple pages that could be personalized. The invention recognizes that what is interesting in the site to its owner is quite different from the information that is interesting to everyone else. The invention allows for the two homepages to be accessed from the same URL depending on the user's relationship to the site. The applicability of the present invention extends to any site so that the "insiders" of the site have a different view than "outsiders" of the site—be it an employee portal, a divisional portal, a team portal, or other portal type. The invention provides the ability to have multiple homepages if different groups of people are identified by the site, allowing for optimized views of the site.

Illustrative Operating Environment

Figure 1:
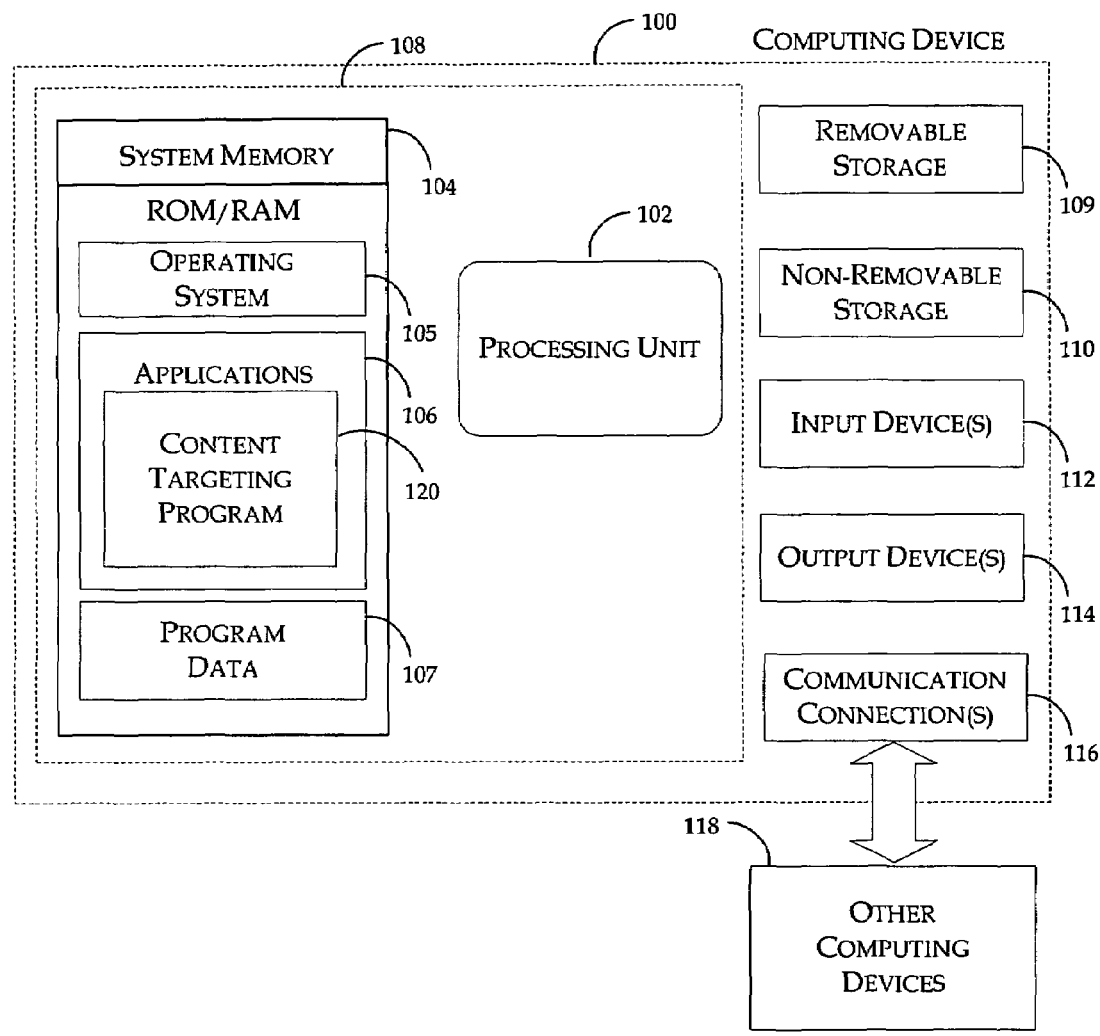
FIG. 1 illustrates an exemplary computing device that may be used according to exemplary embodiments of the present invention.

With reference to FIG. 1, one exemplary system for implementing the invention includes a computing device, such as computing device 100. Computing device may be configured as a client, a server, mobile device, or any other computing device that interacts with targeted content in a network based target content system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a content targeting application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Personal Site System

Figure 2:
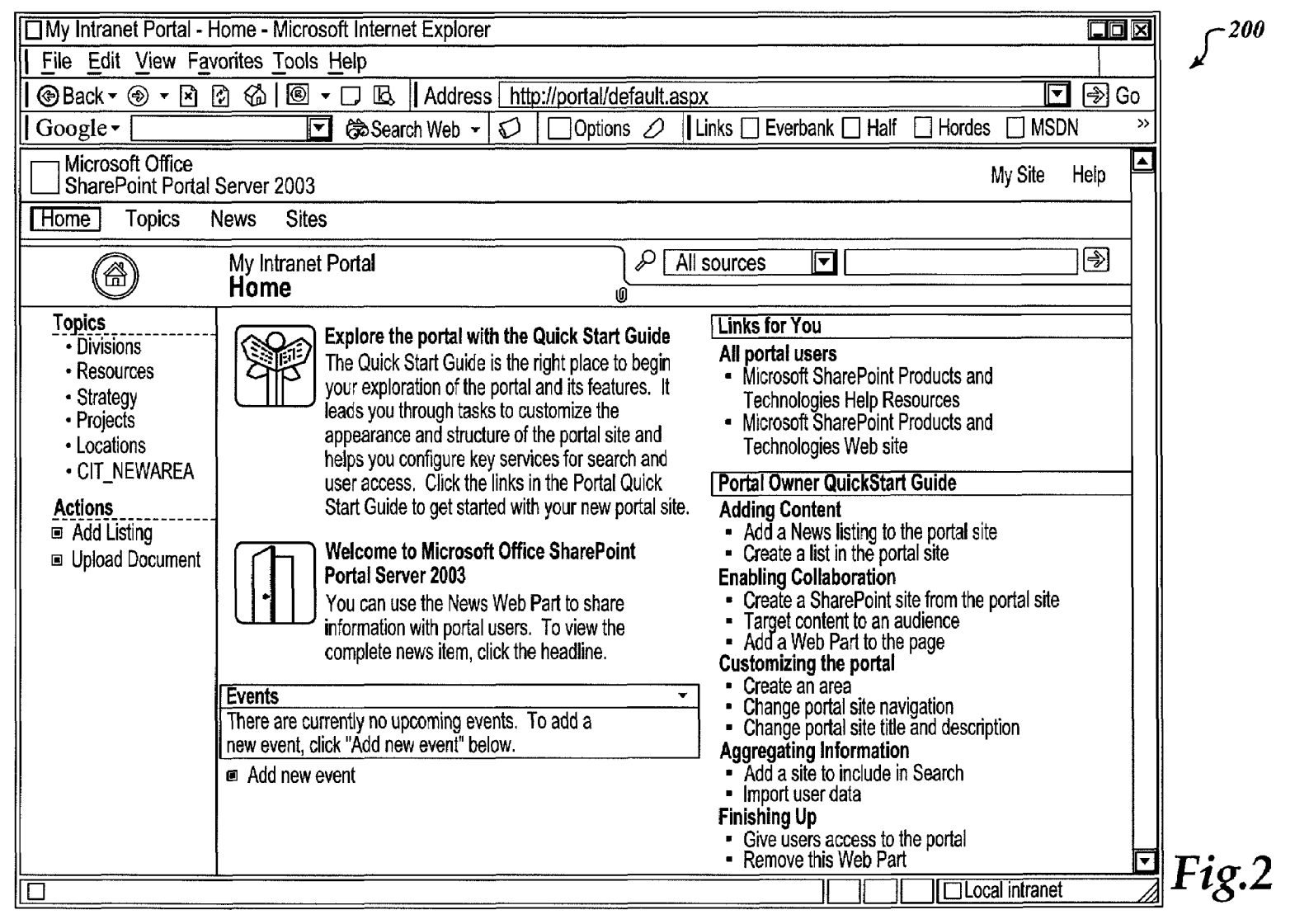

FIG. 2 illustrates an exemplary portal homepage that allows a user to generate a personal site in accordance with the present invention. The portal homepage is the default site that is shown to a user before the user has customized the content for their own personal site or "mypage", or as a general access site to the functions of the portal server. The portal homepage or a similar page may include an option to create a personal site if one has not yet been created. Similarly, if a user has already created a personal site, the portal homepage may include a link for the user to navigate to their personal site from the portal homepage. The portal homepage shown is related to the SHAREPOINT® Portal Server software suite produced by Microsoft Corporation of Redmond, Wash. and is provided by way of example only.

Figure 3:
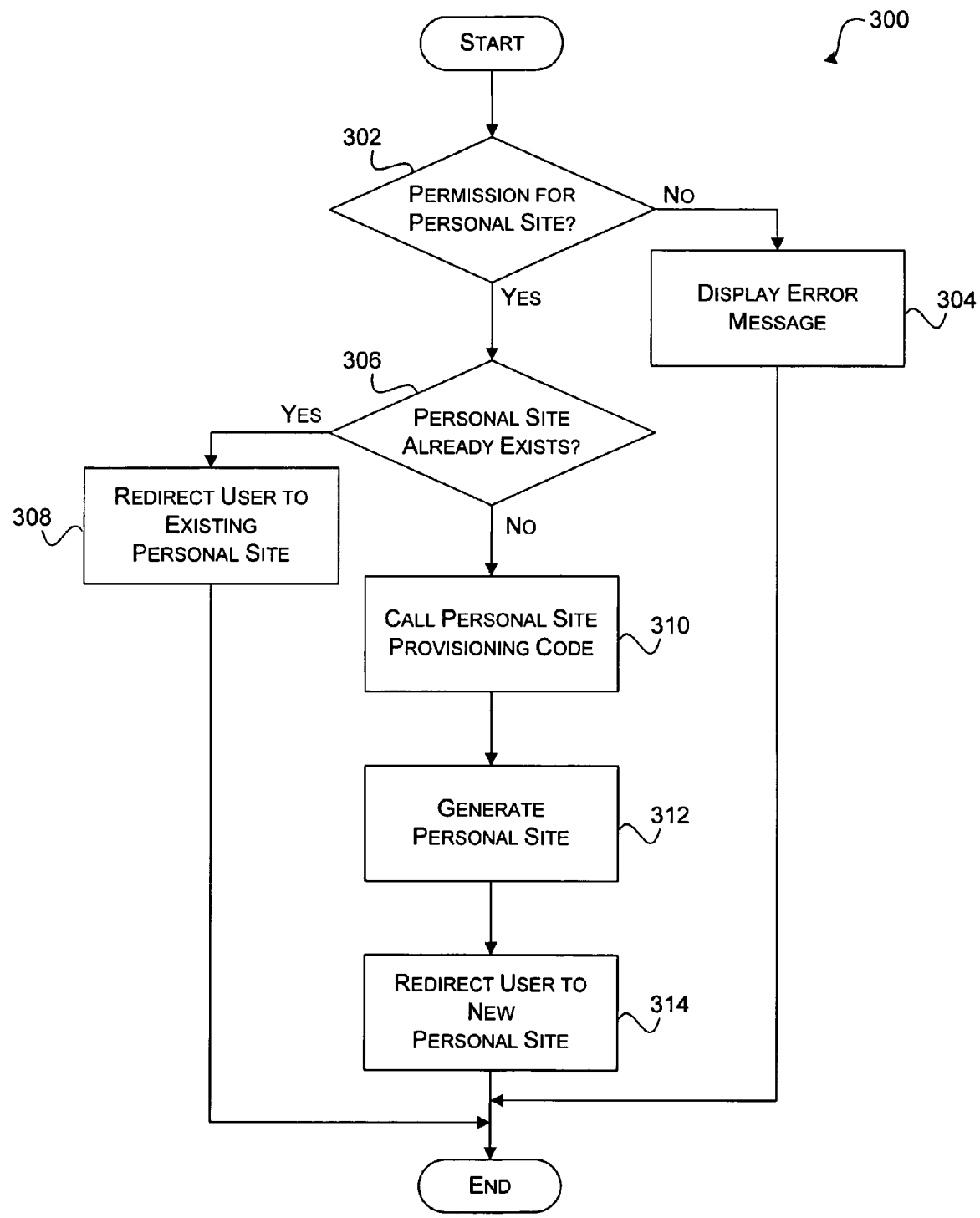
FIG. 3 illustrates a flow diagram for an exemplary process for generating a personal site.

FIG. 3 illustrates a flow diagram for an exemplary process for generating a personal site in accordance with the present invention. Process 300 begins at start block where a user has selected to generate a personal site. Processing continues at decision block 302.

At decision block 302, a determination is made whether the user accessing the portal has permission for a personal site. It may be that certain organizations decide that only certain members are able to have personal sites. The remaining members are then allowed access to information through the portal through a default portal site. In one embodiment, a profile associated with the user is stored in relation to the portal. The profile is checked to determine whether the user does have permission for a personal site. If the user does not have permission to have a personal site, processing moves to block 304. In contrast, if the user does have permission to have a personal site, processing continues at decision block 306.

At block 304, the user is shown an error message (e.g., "Access Denied") since the user did not have permission for a personal site. In another embodiment, a user that does not have permission for generating a personal site, is not even shown a link for generating a personal site. In still a further embodiment, the user may be redirected to a general portal site. The general portal site my be configured similarly to the general portal site shown in FIG. 2. Once the user is shown the error message, processing ends.

At decision block 306, a determination is made whether a personal site already exists for the particular user. The user is first identified and then the user's profile, if one exists, is examined to determine whether a personal exists for the user. If a personal site does exist for the user, processing moves to block 308. In contrast, if the a personal site does not exist for the user, processing advances to block 310.

At block 308, the user is redirected to their existing personal site since their personal site already exists. In one embodiment, a user is restricted from generating any additional sites on the portal server other than their personal site. In another embodiment, a user is allowed to generate other collaborative sites for groups or other organizations outside their own personal site. In either case, if a site exists that is associated with the user, the user is automatically or may selectively be navigated to the associated site rather than having a new site generated. Once the user is redirected to their personal site, processing ends.

At block 310, a personal site provisioning code is called to generate a new personal site for the user since it has already been decided that the user has permission to have a personal site, but does not yet have a personal site. Calling the personal site provisioning code initiates the process for generating the personal site for the user. Processing continues at block 312.

At block 312, the personal site is generated for the user. The personal site provisioning code invokes a site creation API that is used in generating the personal site. In one embodiment, the required properties for initiating the personal site are provided from the user's profiles stored on the portal server. In another embodiment, the user is shown a "work in progress" page while the site creation is taking place. Processing continues at block 314.

At block 314, the user is redirected to the personal site that now provides the functionality of a personal home page for the user. At this point, the user has a fully formed web site that is substantially under his or her administrative control. The site may then be customized according to the user's preferences for content and data storage. The site may also contain administrative information that is outside the user's control (e.g., corporate news). Once the user is navigated to their customizable personal page, the initial site generation process advances to an end block, where process 300 ends.

Figure 4:
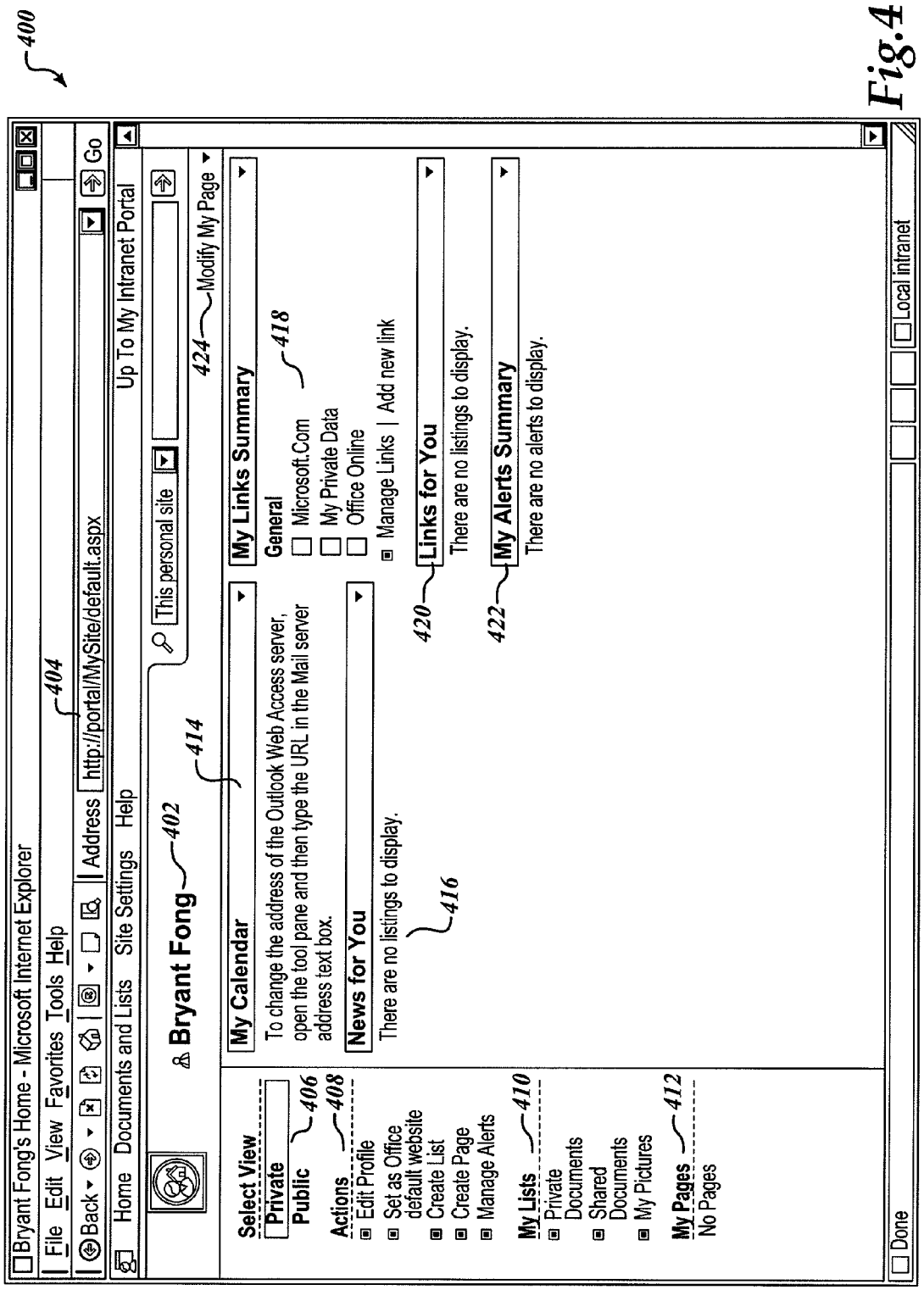
FIG. 4 illustrates an exemplary private view of a personal site.

FIG. 4 illustrates an exemplary private view of a personal site in accordance with the present invention. Personal site 400 shown includes title 402, address 404, selected view 406, selectable actions 408, selectable lists 410, selectable pages 412, calendar 414, news 416, links summary 418, other links 420, and alerts summary 422. Various other embodiments may include other sections, more sections, or fewer sections than those shown. A link within the page may be provided to edit the contents of the page, such as the "modify my page" link 424 shown. Other contents of personal site 400 may include other sections, such as a section that shows a view of the user's inbox associated with their e-mail service.

Figure 6:
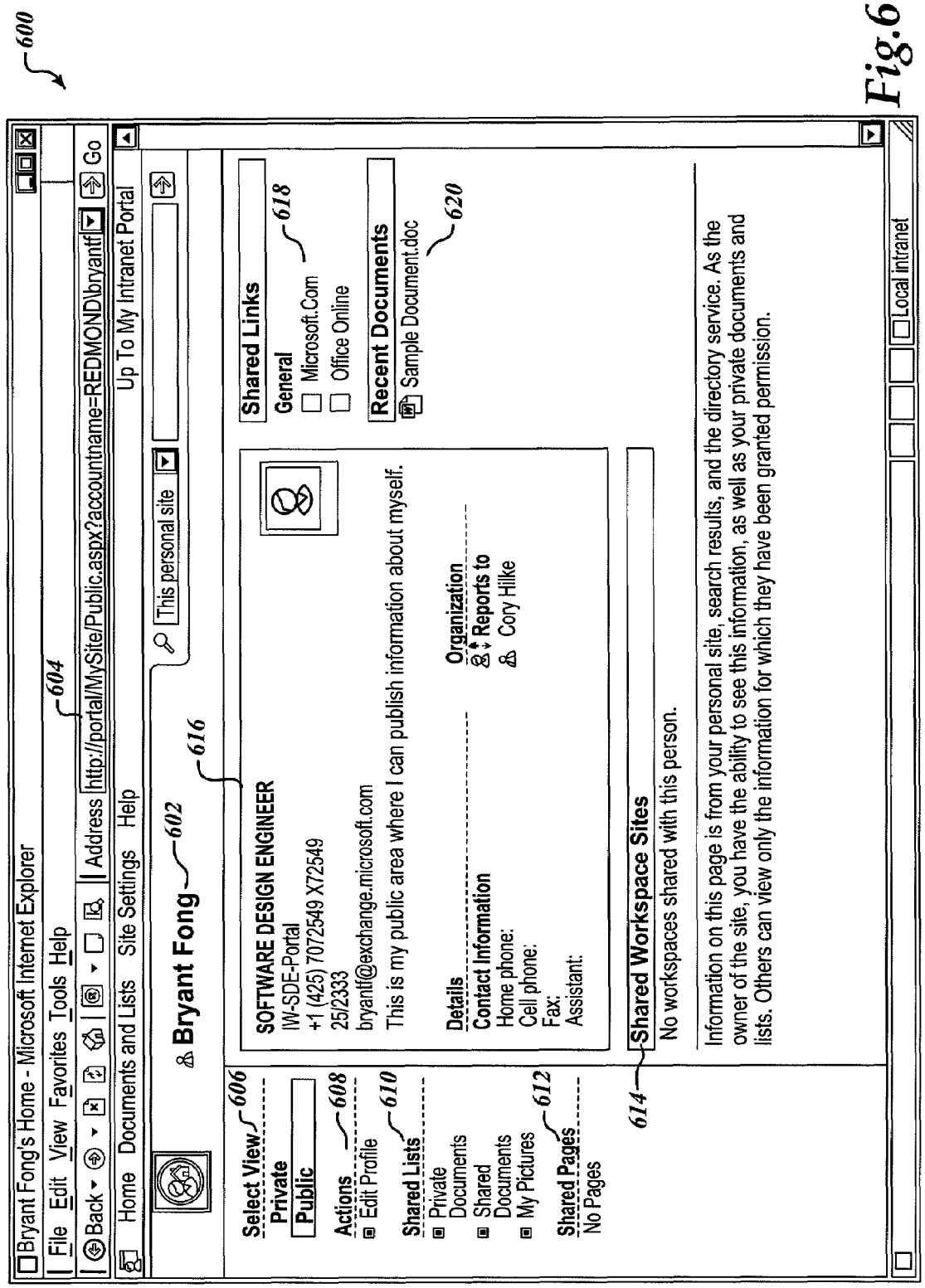
FIG. 6 illustrates an exemplary public view of a personal site as viewed by the personal site owner.
Figure 7:
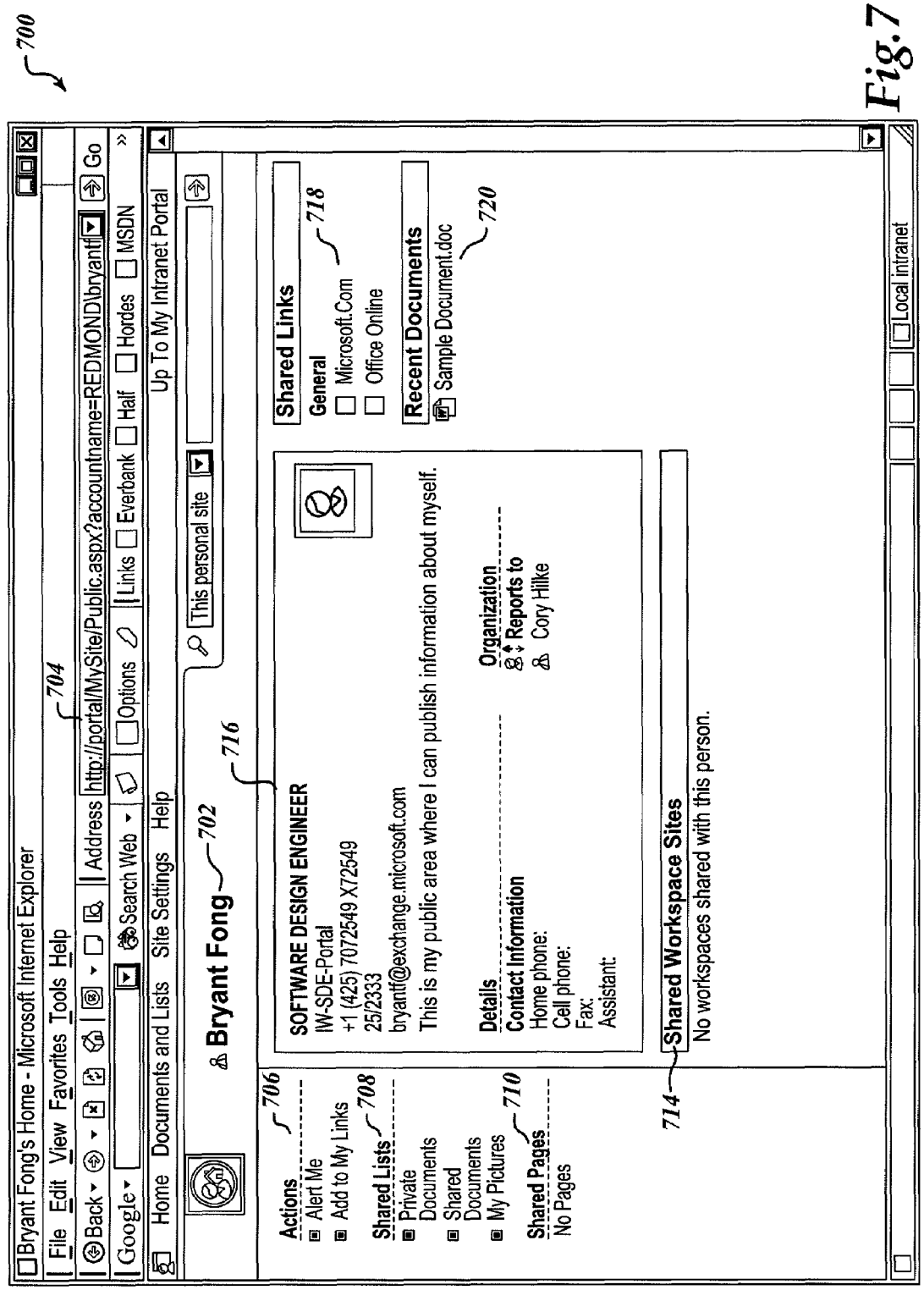
FIG. 7 illustrates an exemplary public view of a personal site as viewed by users other than the personal site.

In the example shown, the personal site is shown in a webpage format corresponding to the format for WINDOWS INTERNET EXPLORER®, a web browser produced by Microsoft Corporation of Redmond, Wash. Title 402 shown in FIG. 4 corresponds to the name of the user, but may correspond to any arbitrarily selected title of the user. Address 404 corresponds to the URL of personal site 400. The URL corresponds to the private view of the personal site for this particular user and therefore includes a "default.aspx" designation. In the description of FIGS. 6 and 7 below, it may be seen that a different designation is shown for the public view of the personal site.

Since personal site 400 is a launch point for the user's daily work related activities, personal site 400 operates as central place to list and manage the links to the things that the user needs to conduct work. There are various ways to customize the personal site 400 with documents and links once the process for designating personal site 400 as the storage location for documents, described in the discussion of FIG. 5 below.

The various sections of personal site 400 are each customizable by the user unless a section is designated as a "lockdown" section. A "lockdown" section refers to a section of the document that is reserved for the organizations use. For example, a company may want to keep employees apprised of certain updates. In this case, a section, such as news 416, may be a lockdown section or have a portion of the section locked so that the user cannot modify it. In this example, news 416 provides news that is targeted by the portal administrator or other organizations to the user, and accordingly news 416 is a lockdown section. If the section is a lockdown section of personal site 400, the user has limited or no ability to change the content of the section. In another embodiment, the lockdown function may be employed so that the employee cannot remove or move the update notices, giving the content pushed to the page by the company a higher likelihood that it will be viewed by the employee.

Figure 5:
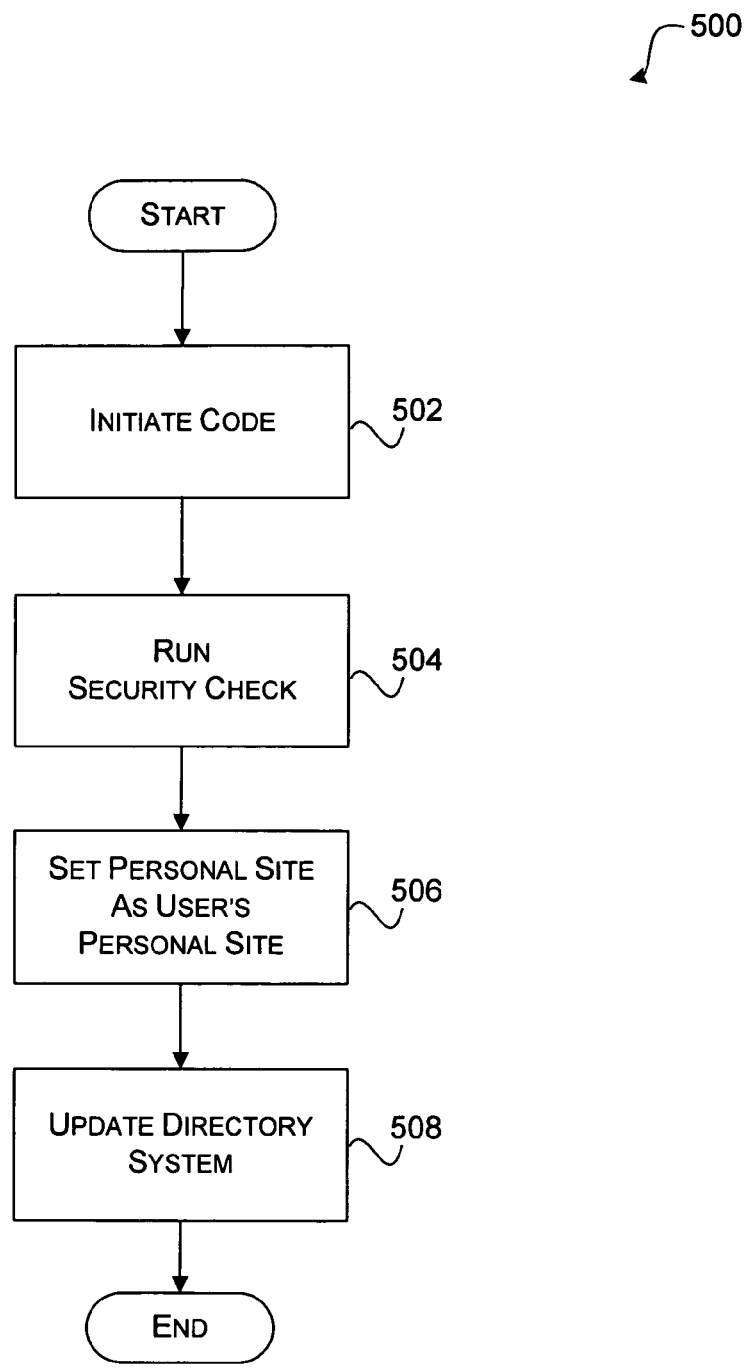
FIG. 5 illustrates a flow diagram for an exemplary process for designating a personal site as belonging to a particular user.

FIG. 5 illustrates a flow diagram for an exemplary process for designating a personal site as belonging to a particular user in accordance with the present invention. Process 500 starts at a start block where a user has selected to designate a particular personal site as their personal site. The personal site may then be used as the default save location for documents and other resources. Processing continues at block 502.

At block 502, the code for setting the personal site as the default save location is initiated. In one embodiment, a script is run on the page that calls an ActiveX® control. The script run in the browser defines an object (e.g., button) that is then utilized by ActiveX® on the client to initiate the default setting. If the personal site location is already designated for this user, the object is hidden and not displayed to the user. In other embodiments, other methods may be used to initiate the default setting. Processing continues at block 504.

At block 504, the control runs a security check to make sure that the default save location command is authentic. A number of security checks may be run. For example, a prompt to the owner may be made to confirm whether to proceed. Also, the page that is calling the ActiveX® control may be checked to make sure that the page is considered a trusted source for the call. Another security check involves determining whether the URL of the page making the call the is same as a URL parameter of the script. The script should be run on the personal site of the owner. Accordingly, the URL of the script and the destination URL for saving documents should be the same. Once the security check is complete, processing moves to block 506.

At block 506, the personal site is set as the personal site for the particular user and may then be used for saving documents and other files generated on the chosen local machine. The ActiveX® control then writes a URL that was given to it by the script to a selected location within the registry.

At block 508, the directory system is updated with the location of the owner's personal site. In one embodiment, this step may be done at any time the owner visits their personal site. Updating the directory system allows the location of the user's personal site to be known on the network. Accordingly, when other users then search for the owner's personal site, the location is known on the directory system. After the directory system is updated, process 500 ends.

Process 500 allows the personal site to be designated as the user's personal site and allows the personal site to be set as the default save location for documents. Using the personal site as the default save location prevents the user from being forced to select the location of each document as they are composed in order to save the documents to the personal site.

FIG. 6 illustrates an exemplary public view of a personal site as viewed by the personal site owner in accordance with the present invention. Personal site 600 shown includes title 602, address 604, selected view 606, selectable actions 608, selectable lists 610, selectable pages 612, shared site list 614, info section 616, shared links 618, and recent documents 620. Various other embodiments may include other sections, more sections, or fewer sections than those shown. Other contents of personal site 600 may include other sections that are associated with a public view of a personal site, such as additional pictures or other information.

In the example shown, the personal site is shown in a webpage format corresponding to the format for WINDOWS INTERNET EXPLORER®, a web browser produced by Microsoft Corporation of Redmond, Wash. Personal site 600 is similar to personal site 400 of FIG. 4, except that certain sections and items of information have changed with the change from the private view to the public view. For example, address 604 of the personal site 600 includes the designation of "Public.aspx" to correspond to the public view. Also, since it is the public view, the calendar, inbox, and other personal sections have been removed. Info section 616 now replaces those sections to provide information about the personal site owner. Also, the links section is referred to as shared links 618. The shared links correspond to those links of the owner's that the owner has designated to share with the public. In one embodiment, the level of permissions for links, as well as for other documents, may be selected so that only certain users may view them when visiting the owner's personal site.

Since the owner is viewing the public view of personal site 600, selected view 606 is shown to allow the user to select between the public and the private view.

FIG. 7 illustrates an exemplary public view of a personal site as viewed by users other than the personal site owner in accordance with the present invention. Personal site 700 shown includes title 702, address 704, selectable actions 706, shared lists 708, shared pages 710, shared site list 714, info section 716, shared links 718, and recent documents 720. Various other embodiments may include other sections, more sections, or fewer sections than those shown. Other contents of personal site 600 may include other sections that are associated with a public view of a personal site, such as additional pictures or other information.

In the example shown, the personal site is shown in a webpage format corresponding to the format for WINDOWS INTERNET EXPLORER®, a web browser produced by Microsoft Corporation of Redmond, Wash. Personal site 700 is similar to personal site 600 of FIG. 6, except for certain actions and information. For example, since someone other than the owner is viewing the public view of personal site 700, a selected view section (see 606 of FIG. 6) is no longer offered to the user. Since the user is not the owner, they are only allowed to view the public view of the owner's personal site. Also, certain actions available to the user have changed. For example, an option to edit the site is no longer offered, but the user is now offered the option of saving this site to their own stored links. In further embodiments, any number of sections or documents may be chosen to be added or removed between the public view and the private view of the personal site.

Figure 8:
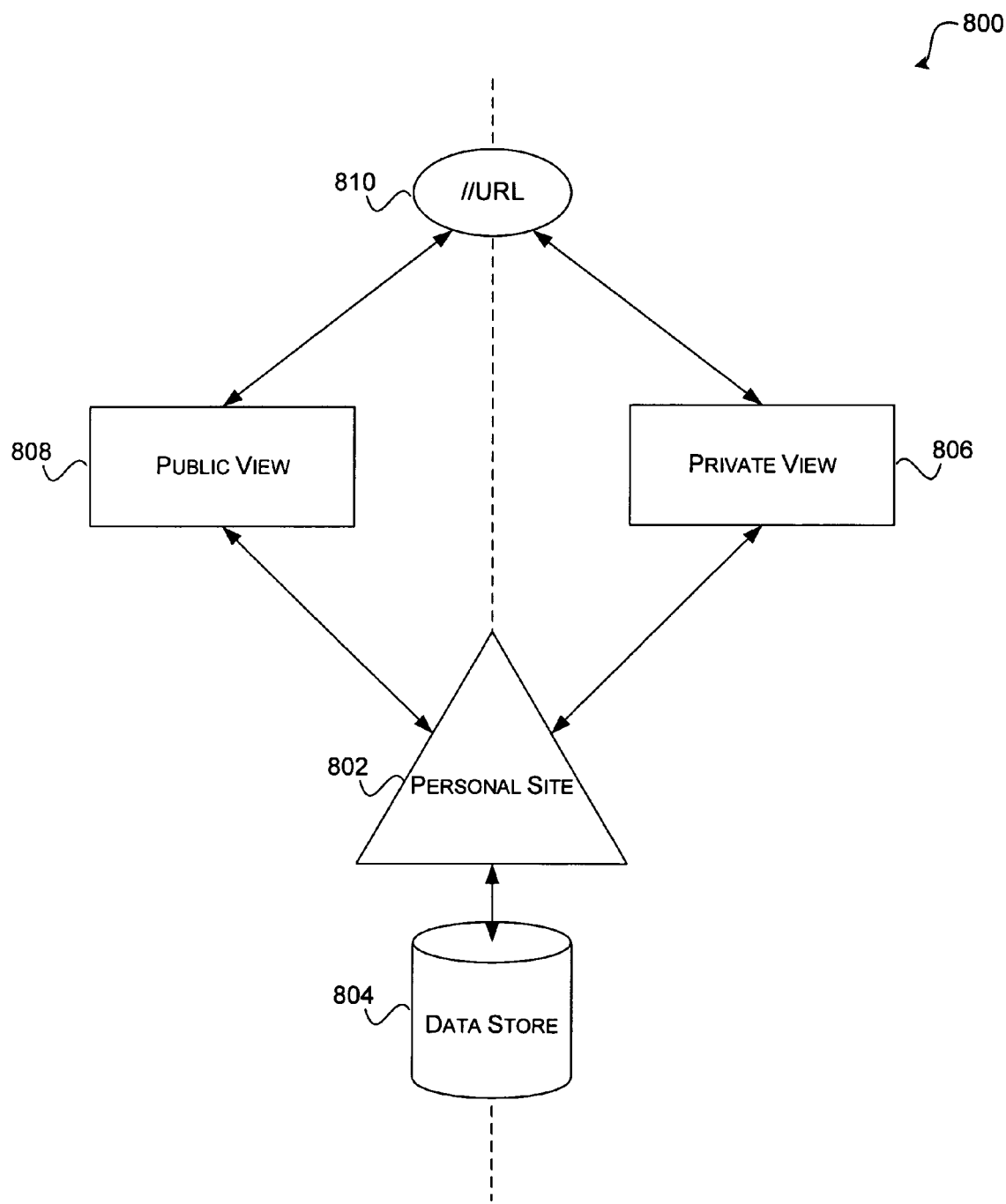
FIG. 8 illustrates a block diagram of an exemplary system for storing and accessing personal sites.

FIG. 8 illustrates a block diagram of an exemplary system for storing and accessing personal sites in accordance with the present invention. The block diagram is meant to illustrate the difference between the public and the private aspects of a particular personal site. Personal site 802 includes associated data store 804, associated private view 806, and associated public view 808. Private view 806 and public view 808 each have an associated URL 810 to which a person is navigated depending on their identity with relation to the personal site.

Data store is available for storing the profile of the owner of personal site 802 as well as storing other information regarding personal site 802. Data store 804 may also be used for storing documents to the personal site as described in the discussion of FIG. 5 above.

Accordingly, personal site 802 does not have an associated URL of its own, but instead has two views (806, 808) that have URLs associated with them. In another embodiment, personal site 802 includes more than a single public view, but instead includes multiple public view based on the identity of the user accessing personal site 802. A user navigating to personal site 802 is therefore directed to one of these views. As described in the process of FIG. 9 below, the user may automatically be navigated to one of the views depending on the user's identity with relation to the personal site.

Figure 9:
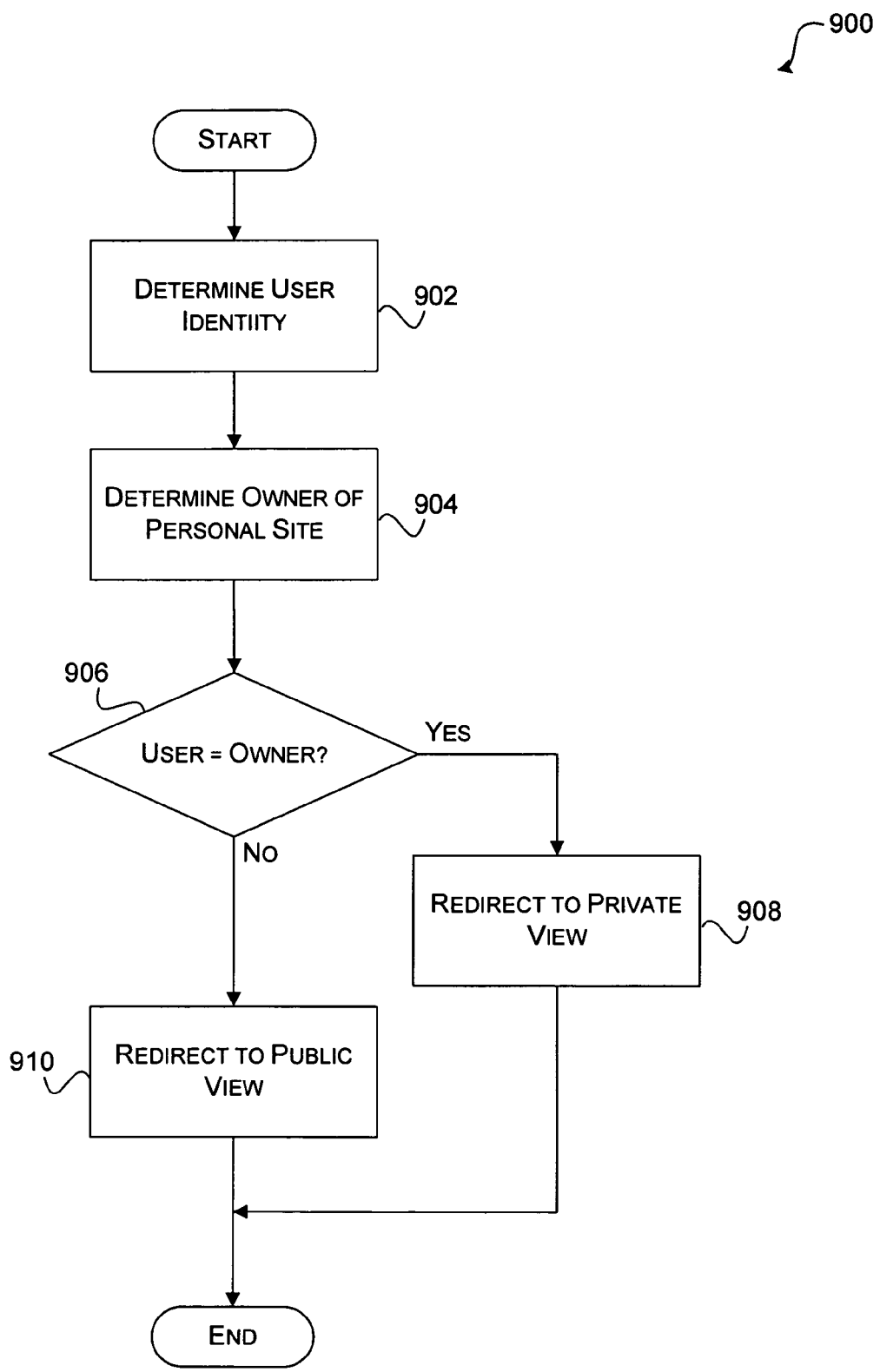
FIG. 9 illustrates a flow diagram for an exemplary process for navigating to a personal site, in accordance with the present invention.

FIG. 9 illustrates a flow diagram for an exemplary process for navigating to a personal site, in accordance with the present invention. Process 900 begins at a start block where a user has entered a URL in an attempt to navigate to a particular personal site. Processing continues at block 902.

At block 902, the identity of the user is examined. The identity of the user may be determined by authenticating the user against the personal site to which the user is navigating. In one embodiment, the internet browser authenticates the user automatically before the server operates to navigate the user. Once the identity of the user is determined, that identity is passed to the server. Processing continues at block 904.

At block 904, the owner of the personal site to which the user is navigating is determined. A lookup of the owner of the personal site is made, which is stored in a property associated with the personal site. Examining the property, the identity of the owner for the personal site may be determined. Once the owner of the personal site is determined, processing continues at decision block 906.

At decision block 906, a determination is made whether the user navigating to the personal site and the owner of the personal site are the same. If the user and the owner are the same, processing continues at block 908. However, if the user and the owner are not the same, processing continues at block 910.

At block 908, the user is redirected to the private view of their personal site since it was determined that the user and the owner were the same. The server gives the internet browser a new URL so that the internet browser navigates the user to the new URL. In this case, the new URL corresponds to the private view of the personal site. Once the user arrives at the private view of the personal site, process 900 ends.

At block 910, the user is redirected to the public view of their personal site since it was determined that the user and the owner were not the same. The server gives the internet browser a new URL so that the internet browser navigates the user to the new URL. In this case, the new URL corresponds to the public view of the personal site. In one embodiment, a string add is performed on the portal URL to include the portion of the URL relevant to this specific personal site. Stated differently, the URL to which the user is navigating is dynamically built prior to redirecting the user to the URL. Once the user arrives at the public view of the personal site, process 900 ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a web site, comprising:
generating a web site that is associated with a particular user; wherein the web site is accessed using an address that is identified by a single Uniform Resource Locator (URL), wherein the web site includes at least two homepages that are accessed from the address that is identified by the single URL; wherein a first home page is a first web page that is viewable by the particular user and a second home page that is a second web page that is viewable by others and contains information about the particular user; wherein the web site stores information relating to the particular user and accesses information including targeted information, documents and links from different sources; wherein the first home page and the second home page are customizable by the particular user;
determining an identity of a user attempting to access the web site; wherein determining the identity of the user includes determining when the user is the particular user; and
automatically redirecting the user to the first home page when the identity of the user is determined to be the particular user and redirecting the user to the second home page when the identity of the user is not determined to be the particular user.

2. The method of claim 1, wherein the web site includes a lockdown section that is reserved for an organization; wherein the lockdown section is non-customizable by the particular user such that content that is pushed to the web site by the organization is displayed within at least one of the first home page and the second home page.

3. The method of claim 2, wherein the web site is a default save location for the particular user's documents.

4. The method of claim 1, wherein generating the web site further comprises providing the user with a selection for generating the web site.

5. The method of claim 1, wherein generating the web site further comprises determining whether the user has permission to generate the web site.

6. The method of claim 5, wherein generating the web site further comprises redirecting the user to a general web site when the user does not have permission to generate the web site.

7. The method of claim 1, wherein generating the web site further comprises determining whether another web site already exists that is associated with the user.

8. The method of claim 7, wherein generating the web site further comprises redirecting the user to the other web site when the other web site does already exist.

9. The method of claim 1, wherein determining when the user is the particular user comprises comparing an identity of an owner associated with the web site to the identity of the user.

10. The method of claim 9, wherein the particular user is presented an option on the second home page to navigate directly to the first home page when the particular user is viewing the second home page.

11. A system for providing a web site that is associated with a particular user, comprising:
    a server including a network communication device coupled to a network and a data store, and a personal site application configured to perform actions, including:
        generating a web site that is associated with a particular user; wherein the web site is accessed using an address that is identified by a single Uniform Resource Locator (URL), wherein the web site includes at least two homepages that are accessed from the address that is identified by the single URL; wherein a first home page is a first web page that is viewable by the particular user and a second home page that is a second web page that is viewable by others and contains information about the particular user; wherein the web site stores information relating to the particular user and accesses information including targeted information, documents and links from different sources; wherein the first home page and the second home page are customizable by the particular user;
        determining an identity of a user attempting to access the web site; wherein determining the identity of the user includes determining when the user is the particular user; and
        automatically redirecting the user to the first home page when the identity of the user is determined to be the particular user and redirecting the user to the second home page when the identity of the user is not determined to be the particular user.

12. The system of claim 11, wherein generating the web site further comprises determining whether the user has permission to generate the web site.

13. The system of claim 12, wherein generating the web site further comprises presenting the user with an error message when the user does not have permission to generate the web site.

14. The system of claim 11, wherein generating the web site further comprises determining whether another web site already exists that is associated with the user.

15. The system of claim 14, wherein generating the web site further comprises redirecting the user to the other web site when the other web site does already exist.

16. The system of claim 11, wherein determining when the user is the particular user comprises comparing an identity of an owner associated with the web site to the identity of the user.

17. The system of claim 16, wherein the particular user is presented an option on the second home page to navigate directly to the first home page when the particular user is viewing the second home page.

18. The system of claim 11, further comprising setting the web site as a default save location for resources generated by an owner associated with the personal site.

19. A method for generating a web site for a particular user, comprising:
    determining whether a user has permission to generate the web site; wherein the web site is accessed using an address that is identified by a single Uniform Resource Locator (URL), wherein the web site includes at least two homepages that are accessed from the address that is identified by the single URL; wherein a first home page is a first web page that is viewable by an owner of the web site and a second home page that is a second web page that is viewable by others and contains information about the owner; wherein the web site stores information relating to the owner and accesses information including targeted information, documents and links from different sources; wherein the first home page and the second home page are customizable by the owner;
    determining whether the web site already exists; and
    creating the web site when the user has permission to generate the web site and the web site does not already exist.

20. The method of claim 19, wherein creating the web site further comprises calling a web site provisioning code.

21. The method of claim 19, wherein creating the web site further comprises redirecting the user to the web site after the web site is created.

22. A method for navigating to a web site, comprising:
    determining a user identity associated with a user navigating to the web site; wherein the web site is accessed using an address that is identified by a single Uniform Resource Locator (URL), wherein the web site includes at least two homepages that are accessed from the address that is identified by the single URL; wherein a first home page is a first web page that is viewable by an owner of the web site and a second home page that is a second web page that is viewable by others and contains information about the owner; wherein the web site stores information relating to the owner and accesses information including targeted information, documents and links from different sources; wherein the first home page and the second home page are customizable by the owner;
    determining an owner identity associated with the owner of the web site to which the user is navigating;
    comparing the user identity to the owner identity;
    redirecting the user to a first home page view that is associated with the web site when the user identity and the owner identity are the same; and
    redirecting the user to a second home page view that is associated with the web site when the user identity and the owner identity are different.

23. The method of claim 22, wherein the first home page view includes a section that is populated with content from an organization to which the owner of the web site is affiliated.

24. The method of claim 22, wherein at least one section of the first home page and the second home page is different depending on the user identity.

25. A method for providing a web site, comprising:

generating a web site that includes at least three different home pages that are accessed through a single Uniform Resource Locator (URL) depending on an identity of a user accessing the web site; wherein a first home page is a first web page that is viewable by the owner; a second home page that is a second web page that is viewable by a first group and contains information about the owner and the first group; and a third home page that is a third web page that is viewable by a second group and contains information about the owner and the second group; wherein the web site stores information relating to the owner, the first group, the second group; documents generated by the owner; and wherein the first web page includes access to information including targeted information, documents and links from different sources;

determining an identity of the user accessing the web site; and automatically redirecting the user to the first home page when the identity of the user is determined to be the owner; redirecting the user to the second home page when the identity of the user is determined to be the first group; and redirecting the user to the third home page when the identity of the user is determined to be the second group.

26. The method of claim 25, further comprising making the web site a default location to save documents that are created by the owner of the web site.

* * * * *